Sept. 15, 1925.  
T. MIDGLEY  
1,554,017  
TIRE MOLD  
Filed Aug. 31, 1923
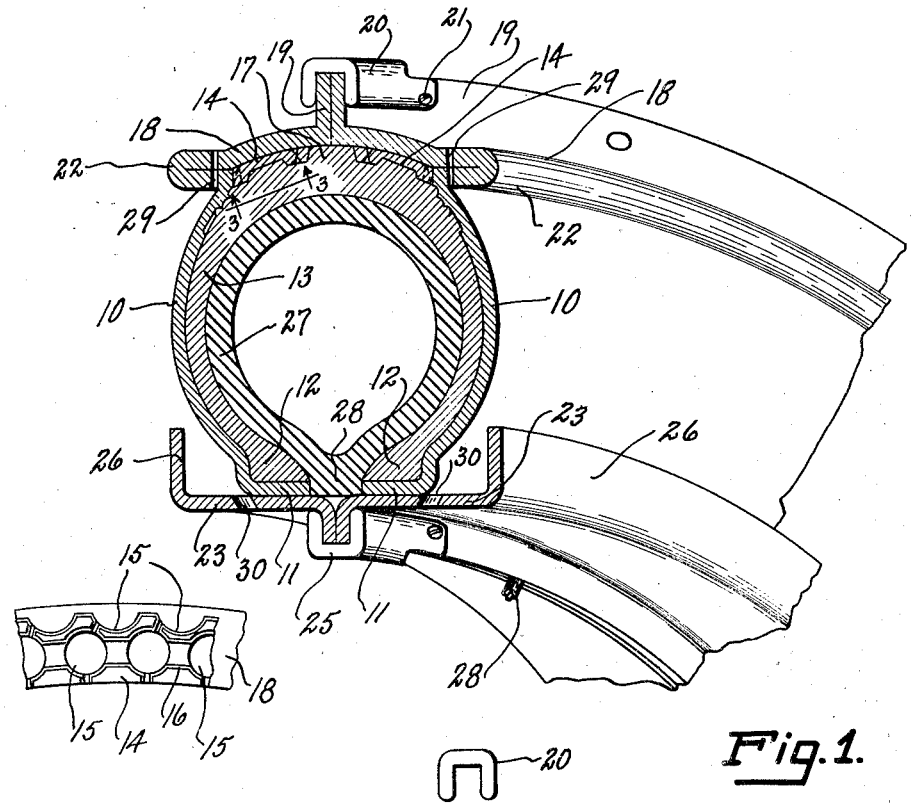
Fig.1.
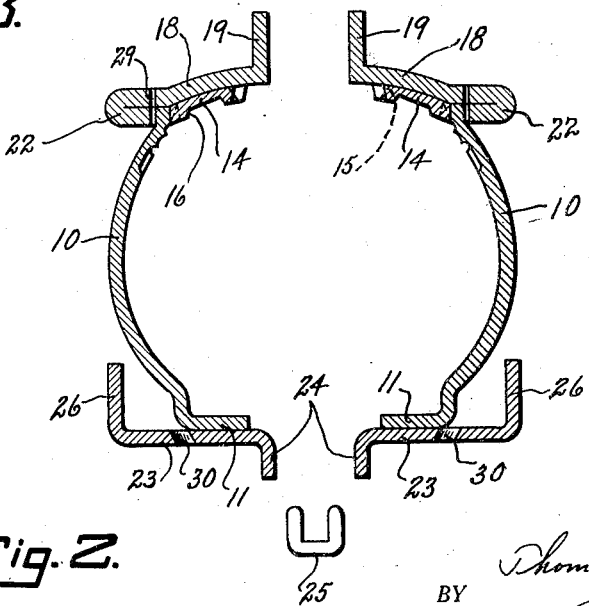
Fig.3.
Fig.2.
INVENTOR.
Thomas Midgley
BY
Edward C. Taylor
ATTORNEY.

Patented Sept. 15, 1925.

1,554,017

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed August 31, 1923. Serial No. 660,296.

*To all whom it may concern:*

Be it known that I, THOMAS MIDGLEY, a citizen of the United States of America, residing at Hampden, in the county of Hampden and State of Massachusetts, have invented certain new and useful Improvements in a Tire Mold, of which the following is a specification.

The present invention relates to tire molds adapted for construction out of sheet metal and particularly intended for use in the vulcanization of automobile tire casings under internal fluid pressure.

This invention is in the nature of a modification of the mold shown and described in my copending application Serial No. 659,813, filed Aug. 28, 1923. The invention will now be described in connection with the accompanying drawings in which Fig. 1 is a sectional perspective view of a mold embodying the invention;

Fig. 2 is a sectional view with the parts separated; and

Fig. 3 is a detail, partly broken away, looking on line 3—3 of Fig. 1.

The mold comprises side plates 10 suitably shaped to the transverse curvature of the sides of the tire to be produced, and having flanges 11 which underlie the bead portions 12 of the tire 13. Extending from the outer portions of the side plates toward the center or parting line of the mold are tread forming strips 14, suitably perforated at 15 and recessed at 16 to produce the desired tread pattern, as is fully described in the manner of forming the mold shown in my copending application above referred to. In the embodiment shown the tread design which it is desired to produce has a central rib shown in Fig. 1 at 17, which is formed by the space in the mold between the tread forming strips 14.

Overlying the tread forming strips are cover plates 18 which close the perforations 15 in the tread forming strips and also extend to the parting line at the center of the mold, thus bridging the gap between the tread forming strips 14. Adjacent the parting line of the mold, plates 18 have outwardly extending flanges 19 which may be joined together to hold the mold assembled by a series of U-shaped clips 20, arranged around the periphery of the mold and attached to one of the flanges 19 as by a screw or rivet 21. The other edge portions of the cover plates are folded on themselves as at 22, abutting against the side plates so as to prevent their lateral movement. Preferably the side plates, cover plates, and tread forming strips are secured together as by spot welding so that they will function as an integral unit during the use of the mold.

Secured as by spot welding to flanges 11 are plates 23 having inwardly extending flanges 24 joined together by clips 25 similar to clips 20 previously described. Plates 23 also have outwardly extending flanges 26 which serve to support the several molds on each other in stack formation, if they are to be piled in a heater. The airbag 27, by which internal fluid pressure is supplied to the tire, is located within the tire when the latter is assembled in the mold and preferably has a neck portion 28 extending between flanges 11. The stem 28 of the airbag passes through suitable grooves in the flanges 24 as indicated in Fig. 1.

To permit of the drainage of condensed moisture, which might otherwise settle in the gutter like portions of the side of the mold, holes 29 are provided at intervals around the circumference adjacent to the juncture of plates 10 and the refolded portion 22 of the cover plates 18. Similar holes 30 are provided near the juncture of plates 23 with the side plates 10.

It will be seen that the mold above described may be constructed entirely of sheet metal, being formed in two mating annular halves, each comprising several elements permanently secured together during the manufacture of the mold. Machine work in forming the mold is reduced to a minimum for the same reasons as given in the description of the mold in my copending application above referred to. The punching work in the present case, however, may sometimes be somewhat simpler for the reason that the tread forming strips 14 do not have to be bent as much as would be the case with the side plates 10 if they were extended to the positions taken in the present mold by strips 14. Changes in the form and design of the various portions of the mold may be made as required by the tire to be manufactured, or by the desires of the mold maker, within the scope of the following claims. As an example of changes in the specific embodiment which may be made while preserving certain of the claimed features of the present invention, attention is directed to my copending application Serial No. 660,297, filed Aug. 31, 1923.

I claim:—

1. A mold adapted for use in the vulcanization of tire casings, constructed in mating annular halves each comprising a side plate, a perforated tread forming plate, and a cover plate overlying the tread forming plate, having an outwardly extending flange adapted for use in retaining the mold halves assembled and refolded portions contacting with the side plates to hold them in position, said three above-mentioned plates being secured permanently together in a unit, flanges on the side plates adapted to underlie the tire beads, ring plates secured to the underlying flanges and provided with an inwardly directed flange adapted to cooperate with a similar flange on the other mold section to hold the mold sections assembled and with an outwardly directed flange adapted to support the molds in stack formation, and devices for cooperating with the parts described holding the mold halves assembled.

2. A mold adapted for use in the vulcanization of tire casings, constructed in mating annular halves each comprising a side plate, a perforated tread forming plate, and a cover plate overlying the tread forming plate, having an outwardly extending flange adapted for use in retaining the mold halves assembled and refolded portions contacting with the side plates to hold them in position, said three above-mentioned plates being secured permanently together in a unit.

3. A mold adapted for use in the vulcanization of tire casings, constructed in mating annular halves each comprising a side plate curved to fit the side of the tire, a tread forming strip extending from the side plate toward the central plane of the mold, a cover plate overlying the tread forming strip and having means for attachment to a similar plate on the other mold half, and an abutment on the cover plate serving to hold the side plate against outward movement, said side plate, tread strip, and cover plate being secured permanently to each other.

4. A mold adapted for use in the vulcanization of tire casings, constructed in mating annular halves each comprising a side plate curved to fit the side of the tire, a tread forming strip extending from the side plate toward the central plane of the mold, and a cover plate overlying the tread forming strip, said side plate, tread strip, and cover plate being secured permanently to each other.

THOMAS MIDGLEY.